(12) United States Patent
Chen et al.

(10) Patent No.: US 9,198,097 B2
(45) Date of Patent: Nov. 24, 2015

(54) METHOD AND DEVICE FOR INITIATING CELL MEASUREMENT

(75) Inventors: Zhongming Chen, Shenzhen (CN); Xiaojuan Shi, Shenzhen (CN); Yada Huang, Shenzhen (CN); Zhongda Du, Shenzhen (CN); Yun Deng, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 211 days.

(21) Appl. No.: 13/257,846

(22) PCT Filed: Dec. 30, 2009

(86) PCT No.: PCT/CN2009/076308
§ 371 (c)(1),
(2), (4) Date: Feb. 10, 2012

(87) PCT Pub. No.: WO2011/020280
PCT Pub. Date: Feb. 24, 2011

(65) Prior Publication Data
US 2012/0196647 A1 Aug. 2, 2012

(30) Foreign Application Priority Data
Aug. 17, 2009 (CN) .......................... 2009 1 0163465

(51) Int. Cl.
*H04W 40/00* (2009.01)
*H04W 36/00* (2009.01)
*H04B 17/00* (2006.01)
*H04W 84/04* (2009.01)

(52) U.S. Cl.
CPC ........ *H04W 36/0083* (2013.01); *H04W 84/045* (2013.01)

(58) Field of Classification Search
CPC ................................................... H04W 84/045
USPC ........................................ 455/513, 444, 453
See application file for complete search history.

(56) References Cited

U.S. PATENT DOCUMENTS

| 2009/0047960 A1 | 2/2009 | Gunnarsson et al. |
| 2009/0104905 A1* | 4/2009 | DiGirolamo et al. ......... 455/434 |

(Continued)

FOREIGN PATENT DOCUMENTS

| CN | 1607852 A | 4/2005 |
| CN | 1610272 A | 4/2005 |

(Continued)

OTHER PUBLICATIONS

International Search Report in international application No. PCT/CN2009/076308, mailed on May 20, 2010.

(Continued)

*Primary Examiner* — Tilahun B Gesesse
(74) *Attorney, Agent, or Firm* — Oppedahl Patent Law Firm LLC

(57) ABSTRACT

This document discusses a method and device for initiating cell measurement. An initiating condition for initiating the measurement of a Closed Subscriber Group (CSG) cell and/or a Hybrid cell is preset by the network side. The measurement of the CSG cells and/or Hybrid cells is initiated by a User Equipment (UE) when the initiating condition is satisfied. The UE automatically initiates the measurement of the CSG cell and/or Hybrid cell when the UE is close to its own footprint area or fingerprint area.

20 Claims, 5 Drawing Sheets

(56) References Cited

U.S. PATENT DOCUMENTS

2010/0240373 A1* 9/2010 Ji et al. .................. 455/436
2010/0323631 A1* 12/2010 Martin et al. ............ 455/67.11

FOREIGN PATENT DOCUMENTS

| | | | |
|---|---|---|---|
| CN | 101330702 A | 12/2008 | |
| JP | 2007251941 A | 9/2007 | |
| JP | 2008131069 A | 6/2008 | |
| JP | 2009049661 A | 3/2009 | |
| JP | 2009077368 A | 4/2009 | |
| JP | 2009141945 A | 6/2009 | |
| JP | 2010541428 A | 12/2010 | |
| WO | 2009022976 A1 | 2/2009 | |
| WO | 2009043002 A2 | 4/2009 | |
| WO | 2009044318 A2 | 4/2009 | |
| WO | 2009060935 A1 | 5/2009 | |

OTHER PUBLICATIONS

English Translation of the Written Opinion of the International Search Authority in international application No. PCT/CN2009/076308, mailed on May 20, 2010.
Evolved Universal Terrestrial Radio Access Jun. 30, 2009.
Supplementary European Search Report in European application No. 09848421.5, mailed on Nov. 17, 2014.
3GPP TSG RAN WG1 Meeting #54, Two-threshold RSRP Trigger Mechanism and the Simulation Results, ZTE, Jeju, Korea, Aug. 12, 2008.

* cited by examiner

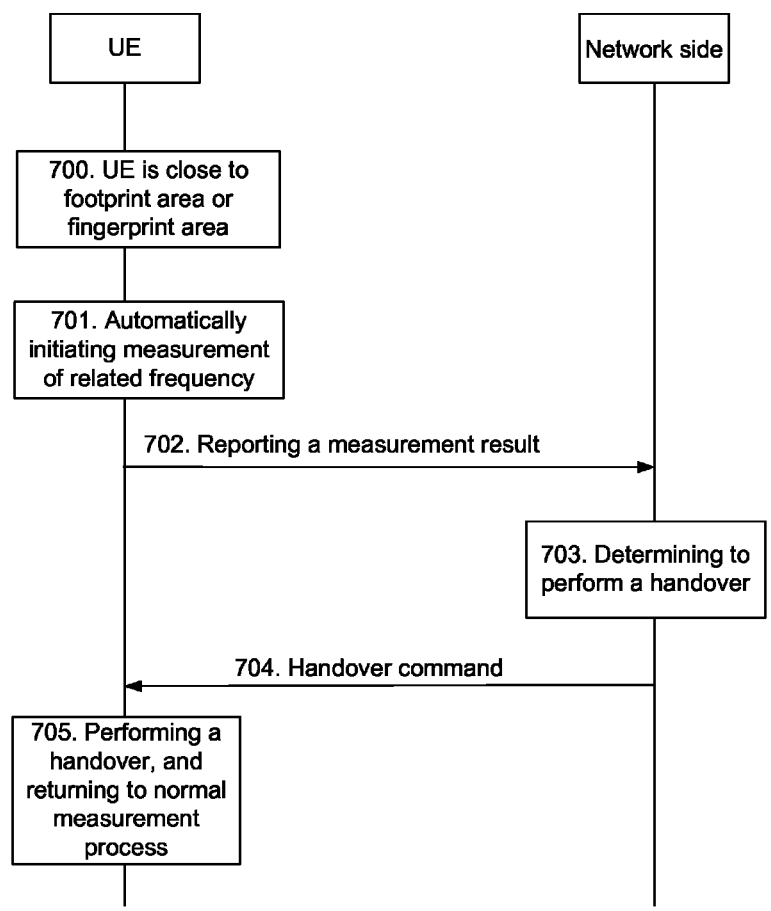

METHOD AND DEVICE FOR INITIATING CELL MEASUREMENT

TECHNICAL FIELD

The disclosure relates to a cell measurement technology in the field of wireless communications, particularly to a method and device for initiating measurement of a Closed Subscriber Group (CSG) cell and/or a Hybrid cell.

BACKGROUND

For saving the network building cost of operators and utilizing the network resources more effectively, while providing the subscribers with the services with low charge rate and high quality, a one-stop wireless access solution is provided, and a wireless access equipment which is called home base station is introduced; the home base station can provide various wireless access functions. When a subscriber uses the home base station in places, such as home, market, company and school, the operators can provide a preferential tariff; besides, a load of a common cell which is called a macro cell can be reduced; the one-stop wireless access solution is a very good optimized solution for indoor coverage.

At present, the home base station has three access modes: a closed mode, an open mode and a hybrid mode. Wherein a home base station of the closed mode only allows authorized subscribers to access and provides services for them; a cell which is covered by the home base station of the closed mode is called a CSG cell. A home base station of the open mode allows all subscribers to access and provides services for them; a cell which is covered by the home base station of the open mode is called an Open cell, which is similar to a macro cell. A home base station of the hybrid mode allows authorized subscribers to access and provides services for them as well as allows unauthorized subscribers to access and provides services for them; a cell which is covered by the home base station of the hybrid mode is called a Hybrid cell. Aiming at the authorized subscribers and the unauthorized subscribers, the Hybrid cell plays different roles: for the authorized subscribers, the Hybrid cell is regarded as a CSG cell; and for the unauthorized subscribers, the Hybrid cell is regarded as an Open cell.

Because the CSG cell or the Hybrid cell has advantages on tariff and can reduce the load of the macro cell, a CSG User Equipment (UE) will access a network to the best of its ability through an authorized CSG cell or Hybrid cell. When the UE wants to access the CSG cell or Hybrid cell, first of all, it needs to measure the CSG cell or Hybrid cell and other adjacent cells, and report the measured signal quality of these adjacent cells to a network side, and then the network side determines whether to access the CSG cell or Hybrid cell.

Under a connection status, the process of the cell measurement mainly comprises: the network side sends a measurement control message to the UE, wherein the measurement control message contains a measurement identity, measurement object, a report configuration and other attributes related to the measurement. The UE performs the measurement according to the measurement object and the report configuration in the measurement control message, and generates a measurement report according to the measurement result and reports the measurement report to the network side.

The UE learns carrier frequency of an adjacent cell through the attributes of the measurement object in the measurement control message, or through historical information stored by the UE itself; the UE completes the synchronization in time with the adjacent cell by searching for Primary Synchronization Signal (PSS) and Secondary Synchronization Signal (SSS) of the adjacent cell, at the same time, can acquire the Physical Cell Identity (PCI) of the adjacent cell; at the moment the UE can read a Reference Signal (RS) of the adjacent cell, so as to acquire the signal quality of the adjacent cell. The current network operators, when performing network planning, reserve part of physical resources, such as PCI, to be dedicated to CSG cells, and notify the UE of configuration of the reversed physical resources in a manner of broadcasting or signaling, etc. so that the UE can determine whether the cell is a CSG cell by scanning a physical layer. Usually, the UE stores the location information of the area which the UE can access, and the area is called fingerprint area or footprint area, at the same time, the UE may store the information, such as carrier frequency, PCI, CGI and other information of the CSG cell which the UE can access, and the information is called historical information.

In the current protocol, the precondition that the UE initiates measurement of an intra-frequency, an inter-frequency and a heterogeneous system configured by the network side is: s-Measure is not configured, or Reference Signal Received Power (RSRP) of a serving cell, which is filtered by a layer 3, is lower than the s-Measure while the s-Measure is configured. Wherein the s-Measure is an designated RSRP value. For describing conveniently, the disclosure calls "a RSRP value of a serving cell which is filtered by a layer 3" as servingRSRP for short.

Configuring the s-Measure aims to reduce the frequency of measurement and report, that is to say, when there is s-Measure configured, and the servingRSRP is always higher than the s-Measure, the UE does not initiate a measurement task configured by the network side. In this case, if there is a CSG cell or a Hybrid cell which is allowed to access near the UE, it is possible that the UE cannot measure the CSG cell or Hybrid cell to realize a handover; therefore, the CSG cell or Hybrid cell cannot play the role well and the load of the macro cell is increased, as a result, the interests of subscribers cannot be protected well.

SUMMARY

On that account, the disclosure mainly aims to provide a method for initiating cell measurement which can make a CSG cell and/or Hybrid cell play the full role, reduce the load of a macro cell and protect the interests of subscribers well.

The disclosure further aims to provide a device for initiating cell measurement which can make the CSG cell and/or Hybrid cell play the full role, reduce the load of the macro cell and protect the interests of subscribers well.

For achieving the above objects, the technical solution of the disclosure is realized as follows.

A method for initiating cell measurement, comprising:

pre-setting an initiating condition for initiating measurement of a CSG cell and/or Hybrid cell; initiating the measurement of the CSG cell and/or Hybrid cell by a UE when the initiating condition is satisfied.

The initiating condition may be: a pre-set RSRP value s-Measure1;

satisfying the initiating condition may be: a servingRSRP, which is a RSRP value of a serving cell and filtered by a layer 3, is lower than the s-Measure1; or satisfying the initiating condition may be: the UE receives an instruction from a network side.

The method may further comprise: when the initiating condition is pre-set RSRP values which are s-Measure and s-Measure1, performing measurement of all measurement tasks by the UE when the servingRSRP is lower than the s-Measure; wherein a measurement object comprises all cells on a designated carrier frequency in the measurement tasks;

performing no measurement of all the measurement tasks by the UE when the servingRSRP is higher than the s-Measure1.

The s-Measure1 may be notified to the UE by the network side through a measurement control message or is set as a default value.

When the s-Measure1 is set as a default value, the default value may be an infinite value or the servingRSRP.

The s-Measure1 may be set aiming at all the carrier frequencies; or the s-Measure1 may be respectively set aiming at each carrier frequency; or the s-Measure1 may be set aiming at multiple carrier frequencies.

The s-Measure1 may be further set aiming at the CSG cell and/or Hybrid cell on one carrier frequency or multiple carrier frequencies or all the carrier frequencies; or the s-Measure1 may be further set aiming at all the cells on one carrier frequency or multiple carrier frequencies.

Satisfying the initiating condition may be: the UE is close to its own footprint area or fingerprint area, and automatically initiates the measurement of the CSG cell and/or Hybrid cell.

The method may further comprise: performing the measurement of the measurement task according to an existing mode by the UE, when the UE departs from its own footprint area or fingerprint area or enters its own footprint area or fingerprint area.

the method may further comprise: when the UE is close to its own footprint area or fingerprint area, reporting a proximity instruction to the network side by the UE; wherein the proximity instruction contains information of the frequency on which the CSG cell or Hybrid cell is, in historical information stored by the UE;

configuring a measurement task aiming at the received frequency information and sending the measurement task to the UE by the network side; wherein a measurement is the received frequency.

The proximity instruction may also contains the servingRSRP.

The s-Measure1 may be set aiming at the frequency received by the network side.

The method may further comprise: reporting a measurement report to the network side by the UE;

after receiving the measurement report from the UE, if determining to perform a handover, sending a handover command to the UE by the network side after a handover preparation process is finished and instructing cancelling of configuration of the s-Measure1 or cancelling of measurement of an inter-frequency at the same time; after receiving the handover command, performing the handover, and deleting the s-Measure1 by the UE at the same time;

if determining not to perform a handover, informing the UE to delete the s-Measure1 by the network side when the UE departs from its own footprint area or fingerprint area and reports a departure instruction; or after receiving the handover command, automatically deleting the s-Measure1 by the UE.

A device for initiating cell measurement, comprising a setting module, an initiating module and a measuring module; wherein the setting module is arranged to set and store an initiating condition for initiating measurement of a CSG cell and/or Hybrid cell;

the initiating module is arranged to send a measurement notice to the measuring module when the initiating condition is satisfied;

the measuring module is arranged to receive the measurement notice from the initiating module and initiate the measurement of the CSG cell and/or Hybrid cell.

The initiating module may be further arranged to receive a servingRSRP, and send the measurement notice to the measuring module when the received servingRSRP satisfies the initiating condition.

The initiating module may be further arranged to determine whether a UE is close to its own footprint area or fingerprint area.

A method for initiating cell measurement, comprising:

pre-setting an initiating condition for initiating measurement of a cell on a carrier frequency; initiating the measurement of the cell on the carrier frequency by a UE when the initiating condition is satisfied; the carrier frequency is specified by the network side;

satisfying the initiating condition is: for a RSRP value s-Measure which is set aiming at different carrier frequencies, when a servingRSRP, which is a RSRP value of a serving cell and filtered by a layer 3, is lower than the s-Measure, initiating the measurement of the cell on the carrier frequency; or satisfying the initiating condition is: the UE receives an instruction from a network side.

The cell may be a CSG cell and/or Hybrid cell;

the initiating condition further may be: the set s-Measure aiming at the carrier frequency on which the CSG cell and/or Hybrid cell is, is different from that aiming at other carrier frequencies; wherein there is one carrier frequency or multiple carrier frequencies on which the CSG cell and/or Hybrid cell is.

The carrier frequency may be dedicated to the CSG cell and/or Hybrid cell, namely, there is no macro cell existing on the carrier frequency; or the carrier frequency may be shared by the CSG cell and/or Hybrid cell as well as a macro cell, namely, there is the CSG cell and/or Hybrid cell as well as the macro cell on the carrier frequency.

The s-Measure may be notified to the UE by the network side through a measurement control message, or is set as a default value.

When the s-Measure is set as a default value, the default value is an infinite value or the servingRSRP.

The method may further comprise: the UE is close to its own footprint area or fingerprint area, and automatically initiates the measurement of the cell.

performing the measurement of a measurement task according to an existing mode by the UE when the UE departs from its own footprint area or fingerprint area or enters its own footprint area or fingerprint area.

The method may further comprise: when the UE is close to its own footprint area or fingerprint area, reporting a proximity instruction to the network side by the UE; wherein the proximity instruction contains information of a frequency on which a cell is, in historical information stored by the UE;

configuring a measurement task aiming at the received frequency information by the network side and sending the measurement task to the UE; a measurement object is the received frequency.

The proximity instruction may further contain the servingRSRP.

The s-Measure may be set aiming at the frequency received by the network side.

It can be seen from above technical solution provided by the disclosure that the initiating condition for initiating the measurement of the CSG cell and/or Hybrid cell is pre-set, when the initiating condition is satisfied, the measurement of the CSG cell and/or Hybrid cell is initiated. The initiating condition is: the UE is close to its own footprint area or fingerprint area and automatically initiates the measurement of the CSG cell and/or Hybrid cell when. The method of the disclosure solves the problem that the signal quality of a serving cell is too good to initiate the measurement of a CSG cell and/or Hybrid cell and hand over to the CSG cell and/or Hybrid cell; the method makes the CSG cell and/or Hybrid cell play the full role, reduces the load of a macro cell and protects the interests of subscribers well.

BRIEF DESCRIPTION OF THE DRAWINGS

FIG. 7 shows a flowchart illustrating the fourth embodiment of a method for initiating cell measurement according to the disclosure.

DETAILED DESCRIPTION

Figure 1:
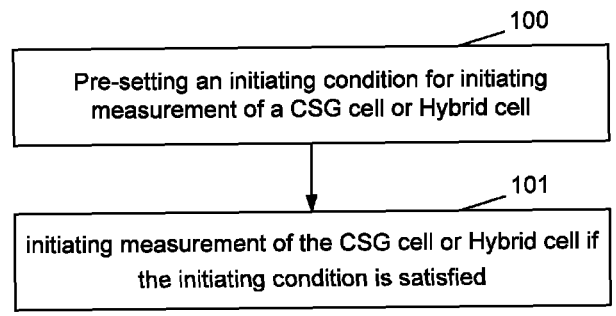
FIG. 1 shows a flowchart illustrating a method for initiating cell measurement according to the disclosure.

FIG. 1 shows a flowchart illustrating the method for initiating cell measurement according to the disclosure; as shown in FIG. 1, the method comprises the following steps.

Step 100: pre-setting an initiating condition for initiating measurement of a CSG cell and/or Hybrid cell;

in this step, the initiating condition refers to a specific s-Measure, which is called s-Measure1; the s-Measure1 is different from the s-Measure; when servingRSRP is higher than the s-Measure and lower than the s-Measure1, the UE initiates the measurement of the CSG cell and/or Hybrid cell.

Step 101: initiating the measurement of the CSG cell or Hybrid cell when the initiating condition is satisfied.

Figure 2:
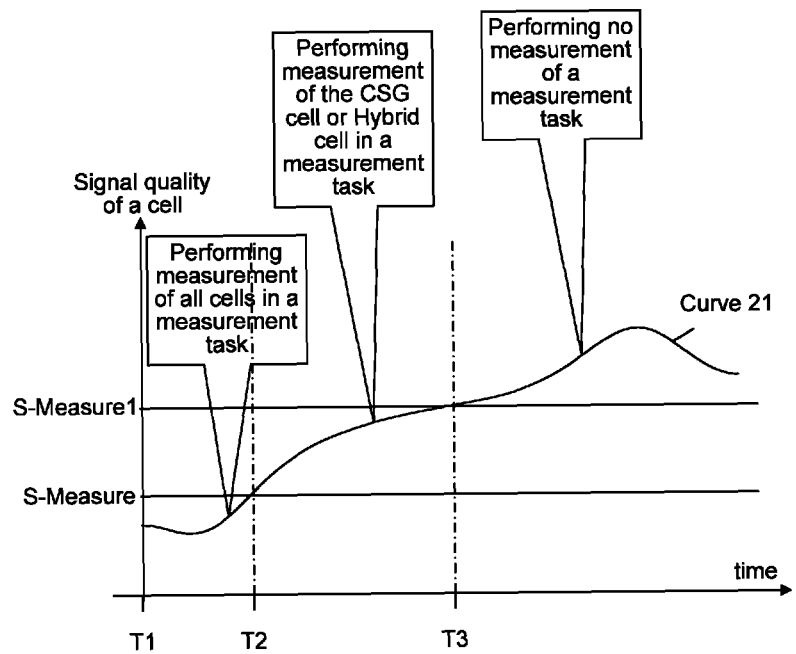
FIG. 2 shows a schematic diagram illustrating cell measurement initiated with the initiating condition of s-Measure and s-Measure1 according to the disclosure.

FIG. 2 shows a schematic diagram illustrating cell measurement initiated with the initiating condition of s-Measure and s-Measure1 according to the disclosure; as shown in FIG. 2, curve 21 indicates RSRP values of a serving cell which are filtered by the layer 3, namely, servingRSRP.

In FIG. 2, from time T1 to T2, the servingRSRP is lower than the s-Measure, the UE performs measurement of all the measurement tasks; and the measurement objects comprise all the cells on a designated carrier frequency in the measurement tasks.

From time T2 to T3, the servingRSRP is higher than the s-Measure but lower than the s-Measure1, the UE performs measurement of the measurement objects which are CSG cells and/or Hybrid cells in all the measurement tasks.

After time T3, the servingRSRP is higher than the s-Measure1, the UE performs no measurement of all the measurement tasks.

Wherein one s-Measure1 can be set for all carrier frequencies, or for each carrier frequency, or for multiple carrier frequencies.

The s-Measure1 can be notified to the UE by the network side through a measurement control message, can also be a default value, such as an infinite value or servingRSRP. When the s-Measure1 is set to be an infinite value or servingRSRP, it indicates that measurement objects in a measurement task performed by the UE comprise CSG cells and/or Hybrid cells at any time.

Furthermore, the UE initiates the measurement of a CSG cell and/or Hybrid cell in a measurement task according to the initiating condition of the disclosure after the UE is close to its own footprint area or fingerprint area.

The UE performs the measurement of the measurement task in an existing mode when departing from its own footprint area or fingerprint area, or entering its own footprint area or fingerprint area.

The method of the disclosure solves the problem that a signal of a serving cell is too good to initiate measurement of a CSG cell and/or Hybrid cell leading to be unable to hand over to the CSG cell and/or Hybrid cell; the method makes the CSG cell and/or Hybrid cell play the full role, reduces the load of a macro cell and protects interests of subscribers well.

The method of the disclosure further comprises: when the UE is close to its own footprint area or fingerprint area, the UE reports a proximity instruction to a network side; wherein the proximity instruction contains information of the frequency on which the CSG cell and/or Hybrid cell is, in the historical information stored by the UE; as to the received frequency information, the measurement task is configured by the network side, wherein a carrier frequency of the measurement object is the above frequency and sent to the UE.

The proximity instruction further contains the servingRSRP.

The method of the disclosure further comprises: the UE reports a measurement report to the network side;

after receiving the measurement report from the UE, when determining to perform a handover, the network side sends a handover command to the UE after a handover preparation process is finished as well as instructs cancelling configuration of the s-Measure1, or cancelling configuration of an inter-frequency measurement task at the same time; after receiving the handover command, the UE performs the handover and deletes the s-Measure1 at the same time;

when determining not to perform a handover, the network side informs the UE to delete the s-Measure1 when the UE departs from the footprint area or fingerprint area and reports a departure instruction; or after receiving the handover command, the UE automatically deletes the s-Measure1.

It should be noted that, cells on a certain carrier frequency comprise a CSG cell, a Hybrid cell and a macro cell. Another method of the disclosure is: pre-setting an initiating condition for initiating measurement of cells on a certain carrier frequency; when the initiating condition is satisfied, the UE initiates the measurement of all cells on the carrier frequency. Wherein the initiating condition is: setting s-Measure for different carrier frequencies; or, satisfying the initiating condition is: the UE receives an instruction from the network side.

The cell is a CSG cell and/or Hybrid cell; s-Measure set for the carrier frequency on which the CSG cell and/or Hybrid cell is, is different from that set for other carrier frequencies; there is one carrier frequency or multiple carrier frequencies on which the CSG cell and/or Hybrid cell is.

The carrier frequency is dedicated to the CSG cell and/or Hybrid cell, namely, there is no macro cell existing on the carrier frequency; or the carrier frequency is shared by the CSG cell and/or Hybrid cell as well as a macro cell, namely, there are a CSG cell and/or Hybrid cell as well as a macro cell on the carrier frequency.

The s-Measure is notified to the UE by the network side through the measurement control message or set as a default value.

When the s-Measure is set as a default value, the default value is an infinite value or servingRSRP.

After the UE is close to its own footprint area or fingerprint area, the UE initiates the measurement of a cell in the measurement task according to the initiating condition.

The method further comprises: the UE performs the measurement of a measurement task in an existing mode, when departing from its own footprint area or fingerprint area or entering its own footprint area or fingerprint area.

When the UE is close to its own footprint area or fingerprint area, the method further comprises:

the UE reports a proximity instruction to the network side; wherein the proximity instruction contains information of the frequency on which the cell is, in the historical information stored by the UE;

aiming at the received frequency information, the network side configures a measurement task and send the measurement task to the UE, wherein the measurement object is the received frequency.

The proximity instruction further contains servingRSRP.

The s-Measure is set for the frequency received by the network side.

When the cells on a certain carrier frequency also comprise a macro cell except a CSG cell and/or Hybrid cell, the method of the disclosure further comprises: the UE initiates the measurement of all cells on the carrier frequency, namely, setting s-Measure1 for all the cells on the certain carrier frequency.

Figure 3:
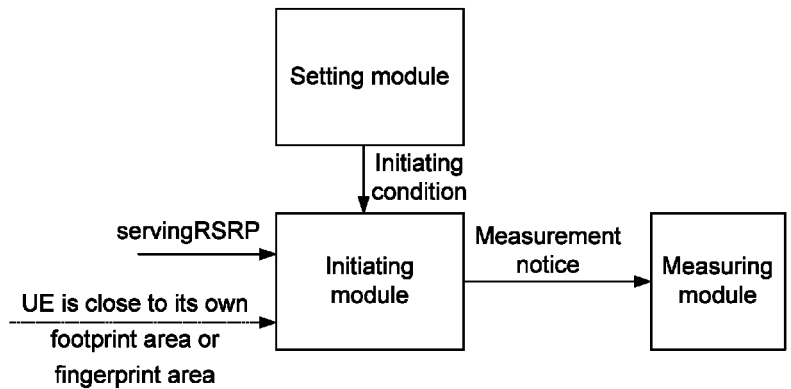
FIG. 3 shows a structural diagram illustrating a device for initiating cell measurement according to the disclosure.

FIG. 3 shows a structural diagram illustrating a device for initiating cell measurement according to the disclosure; as shown in FIG. 3, the device of the disclosure comprises a setting module, an initiating module and a measuring module; wherein the setting module is used for setting and storing an initiating condition for initiating measurement of a CSG cell and/or Hybrid cell;

the initiating module is used for receiving servingRSRP, and sending a measurement notice to the measuring module when the received servingRSRP satisfies the initiating condition;

the measuring module is used for receiving the measurement notice from the initiating module and initiating the measurement of the CSG cell and/or Hybrid cell.

The initiating module is further used for determining whether the received servingRSRP satisfies the initiating condition when receiving the information that the UE is close to its own footprint area or fingerprint area.

The method of the disclosure is described below with reference to the embodiments in detail.

The First Embodiment

Figure 4:
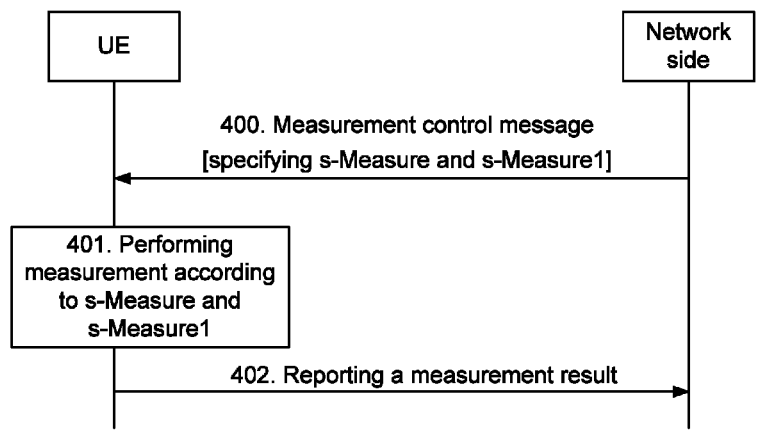
FIG. 4 shows a flowchart illustrating the first embodiment of a method for initiating cell measurement according to the disclosure.

FIG. 4 shows a flowchart illustrating the first embodiment of the method for initiating cell measurement according to the disclosure; in the first embodiment, supposing that the UE is in a connection status in an EUTRAN system, the frequency of the serving cell where the UE is located is f1. As shown in FIG. 4, the method comprises the following steps.

Step 400: a network side sends a measurement control message to the UE, wherein the measurement control message contains two s-Measures, one is s-Measure for measurement of a macro cell, and the other is s-Measure1 for measurement of a CSG cell and/or Hybrid cell; the s-Measure1 is higher than the s-Measure; in addition, the measurement control message further contains a measurement task 1, which is a trigger event A3 that the signal quality of an EUTRAN adjacent cell is better than that of the serving cell, and the carrier frequency of the measurement object is f1, and the measurement control message further contains a measurement task 2, which is a trigger event A3 that the signal quality of an EUTRAN adjacent cell is higher than that of the serving cell, and the carrier frequency of measurement object is f2.

Step 401: the UE performs measurement according to the s-Measure and s-Measure1.

With reference to FIG. 2, from time T1 to T2, the servingRSRP is lower than the s-Measure, the UE performs measurement of the measurement tasks 1 and 2; and the measurement object include all the cells on the carrier frequencies f1 and f2; supposing that the UE finds that a macro cell C1 and a CSG cell C2 on the carrier frequency f1 satisfy the trigger condition of A3 in the measurement task 1, and a macro cell C3 and a CSG cell C4 on the carrier frequency f2 satisfy the trigger condition of A3 in the measurement task 2, then the UE reports it to the network side; wherein the report of the measurement task 1 comprises the cells C1 and C2, and the report of the measurement task 2 comprises the cells C3 and C4;

from time T2 to T3, the servingRSRP is higher than the s-Measure but lower than the s-Measure1, the UE performs measurement of the measurement tasks 1 and 2; and the measurement object are the CSG cells and/or Hybrid cells on the carrier frequencies f1 and f2; supposing that the UE finds that a new CSG cell C5 on the carrier frequency f1 satisfies the trigger condition of A3 in the measurement task 1, and a new CSG cell C6 on the carrier frequency f2 satisfies the trigger condition of A3 in the measurement task 2, then the UE reports it to the network side; wherein the report of the measurement task 1 comprises the cells C2 and C5, and the report of the measurement task 2 comprises the cells C4 and C6; because the UE does not measure the macro cells C1 and C3, the related measurement reports do not comprise the two cells;

after time T3, the servingRSRP is higher than the s-Measure1, the UE does not perform measurement of the measurement tasks 1 and 2 and does not report the report of the measurement tasks to the network side.

In the step, the s-Measure1 can be realized by setting an offset for the s-Measure, for example, setting the s-Measure and an offset; then

*s*-Measure1=*s*-Measure+offset, or *s*-Measure1=*s*-Measure−offset.

The s-Measure1 can be set only for the CSG cells and/or Hybrid cells on the carrier frequency f1; in this case, from time T2 to T3, the UE only performs measurement of the measurement task 1, wherein the measurement object are the CSG cells and/or Hybrid cells on the carrier frequency f1, and the UE does not perform measurement of the measurement task 2. The s-Measure1 can also be set for all the cells on the carrier frequency f1; in this case, from time T2 to T3, the UE only performs measurement of the measurement task 1, wherein the measurement object are all the cells on the carrier frequency f1, and the UE does not perform measurement of the measurement task 2.

The Second Embodiment

Figure 5:
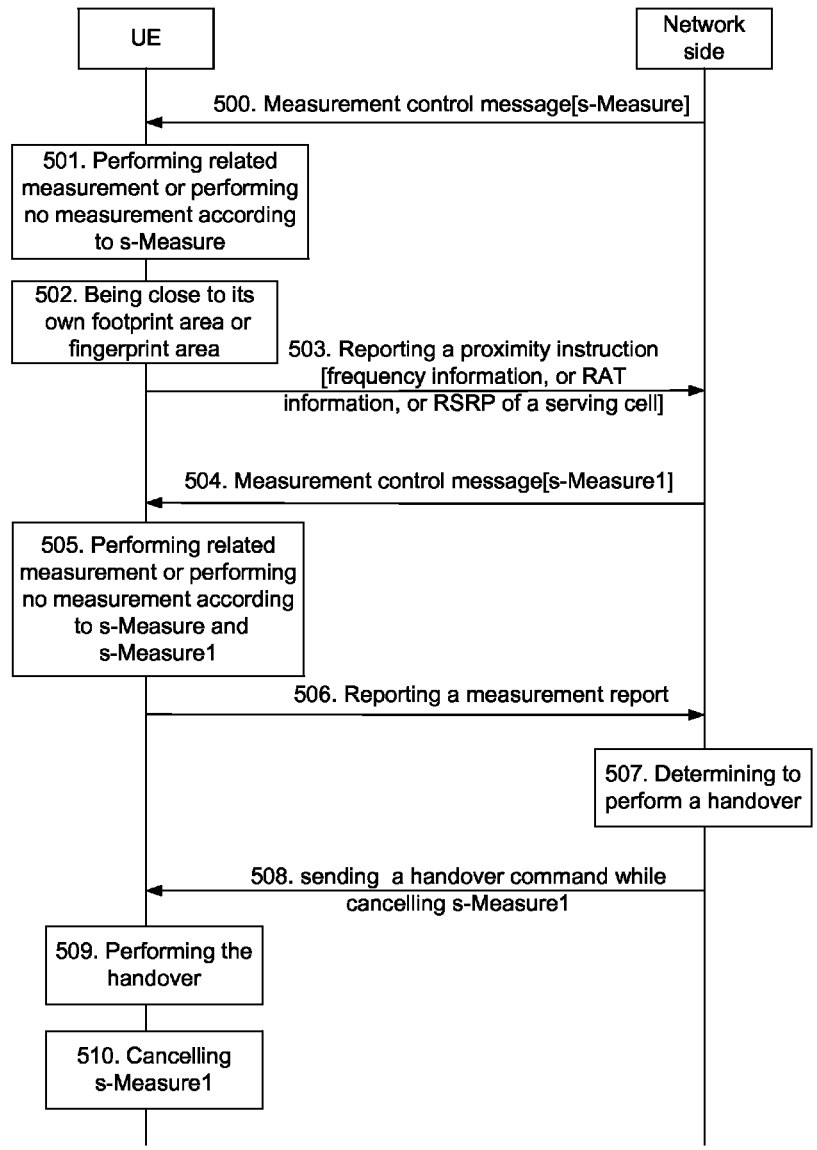
FIG. 5 shows a flowchart illustrating the second embodiment of a method for initiating cell measurement according to the disclosure.

FIG. 5 shows a flowchart illustrating the second embodiment of the method for initiating cell measurement according to the disclosure; in the second embodiment, supposing that the UE is in a connection status in the EUTRAN system, the frequency of the serving cell where the UE is located is f1. As shown in FIG. 5 the method comprises the following steps.

Step 500: the network side sends a measurement control message to the UE, wherein the measurement control message contains s-Measure; in addition, the measurement control message contains a measurement task 1, which is a trigger event A3 that the signal quality of an EUTRAN adjacent cell is better than that of the serving cell, and the carrier frequency of the measurement object is f1, and the measurement control message further contains a measurement task 2, which is a trigger event A3 that the signal quality of an EUTRAN adjacent cell is higher than that of the serving cell, and the carrier frequency of the measurement object is f2.

Step 501: the UE performs related measurement or does not perform measurement according to the s-Measure.

The precondition that the UE performs the measurement tasks is: the servingRSRP is lower than the s-Measure; when the current servingRSRP is higher than the s-Measure, the UE does not perform the measurement of the measurement tasks 1 and 2.

Steps 502~503: supposing that the UE is close to its own footprint area or fingerprint area, the UE reports a proximity instruction to the network side, and the proximity instruction contains the carrier frequency f1 on which a CSG cell and/or Hybrid cell is in the historical information stored by the UE, or RAT information, or RSRP of the serving cell, namely, the servingRSRP.

In this step, the UE may not report the servingRSRP.

Step 504: the network side sends a measurement control message to the UE, wherein the measurement control message contains s-Measure1 which is set for the carrier frequency f1 and higher than the servingRSRP; the s-Measure1 is used for initiating measurement of all the cells on the carrier frequency f1, namely, the UE performs the measurement of the measurement task 1 according to the s-Measure1 and performs the measurement of the measurement task 2 according to the s-Measure.

In the steps 502~503, when the UE does not report the servingRSRP, the network side can set the s-Measure1 as an infinite value or the servingRSRP; after receiving the measurement control message, the UE initiates measurement of all the cells on the carrier frequency f1 unconditionally.

In addition, in steps 502~503, when the UE finds that the frequency on which the CSG cell or Hybrid cell is in the historical information is a measurement object, such as frequency f3, which is not sent by the network side, and reports the frequency to the network side, then in this step, the network side can configure a measurement task 3 to the UE, and the carrier frequency of the measurement object is f3, at the same time, a s-Measure1 can be specified for the f3.

In this step, the network side also may not configure the s-Measure1 for the UE but provides a measurement initiating instruction; the measurement initiating instruction can aim at all cells on the f1, after receiving the measurement initiating instruction, the UE performs measurement of all the cells in the measurement task 1; or, the measurement initiating instruction can also aim at CSG cells and/or Hybrid cells on all carrier frequencies, after receiving the measurement initiating instruction, the UE performs measurement of the CSG cells and/or Hybrid cells in the measurement tasks 1 and 2; or the measurement initiating instruction can also aim at CSG cells and/or Hybrid cells on the carrier frequency f1, after receiving the instruction, the UE performs measurement of the CSG cells and/or Hybrid cells in the measurement task 1. Likewise, the network side withdraws the measurement initiating instruction back while cancelling the s-Measure1.

Steps 505~506: the UE performs related measurement or does not perform measurement according to the s-Measure and the s-Measure1; the current servingRSRP is higher than the s-Measure and lower than the s-Measure1, so the UE performs measurement of the measurement task 1 according to the s-Measure1, but does not perform measurement of the measurement task 2.

Supposing that the UE performs measurement of all the cells in the measurement task 1, and finds that a CSG cell 1 satisfies the trigger condition of A3 in the measurement task 1, and then the UE reports the measurement result to the network side, wherein the measurement result comprises the cell C1.

In this step, if the UE finds that there is no CSG cell or Hybrid cell which can be accessed on the carrier frequency f1, for example, the cell C1 is not allowed to be accessed, the UE can report the result of not allowing to access to the network side, or can instruct the network side to cancel the s-Measure1; at the same time, the UE also cancels its own s-Measure1; in this case, after receiving the result of not allowing to access which is reported by the UE, the network side does not inform the UE to cancel the s-Measure1 any more.

If the UE finds that there are a CSG cell C1 and a CSG cell C2 on the carrier frequency f1 and both cells satisfy the trigger condition of A3 in the measurement task 1, and the signal quality of the cell C1 is better than that of the cell C2, but the cell C1 is not allowed to be accessed and the cell C2 is allowed to be accessed, then the UE may not report the measurement result but just informs the network side to cancel the s-Measure1, or informs the network side that the best CSG cell C1 is not allowed to be accessed; or the UE may also report the measurement result, and then the network side determines whether to hand over.

If the UE finds that both the CSG cell C1 and a macro cell C3 satisfy the trigger condition of the event A3 in the measurement task 1, and the signal quality of the cell C3 is better than that of the cell C1, then the UE may not report the measurement report but just informs the network side to cancel the s-Measure1, or informs the network side that the CSG cell C1 is not the best cell on the carrier frequency f1; or the UE may also report the measurement result, and then the network side determines whether to hand over.

Steps 507~510: after receiving the measurement report from the UE, supposing that it is determined to performed the handover, the network side sends a handover command to the UE after the handover preparation process is finished, the network side may instruct to cancel configuration of the s-Measure1 at the same time; after receiving the handover command, the UE performs the handover as well as deletes the s-Measure1.

Wherein the s-Measure1 can aim at the CSG cells and/or Hybrid cells on all carrier frequencies, namely, after receiving the s-Measure1, the UE performs measurement of the CSG cells and/or Hybrid cells in the measurement tasks 1 and 2. The s-Measure1 can also be used for measurement of the CSG cells and/or Hybrid cells on the carrier frequency f1; after receiving the s-Measure1, the UE measures the CSG cells and/or Hybrid cells on the carrier frequency f1, and the measurement of other cells on the carrier frequency f1 and the measurement of all the cells on other carrier frequencies, such as the carrier frequency f2 are not performed according to the existing method based on the s-Measure.

In this step, if the network side finds the handover cannot be performed after receiving the measurement report from the UE, and then the network side informs the UE to delete the s-Measure1 when the UE departs from the footprint area or fingerprint area and reports a departure instruction; after receiving the notice, the UE stops the measurement of the measurement task 1 according to the existing measurement method based on the s-Measure.

The network side can also not display cancelling of the s-Measure1; after receiving the handover command, the UE automatically deletes the s-Measure1.

The Third Embodiment

Figure 6:
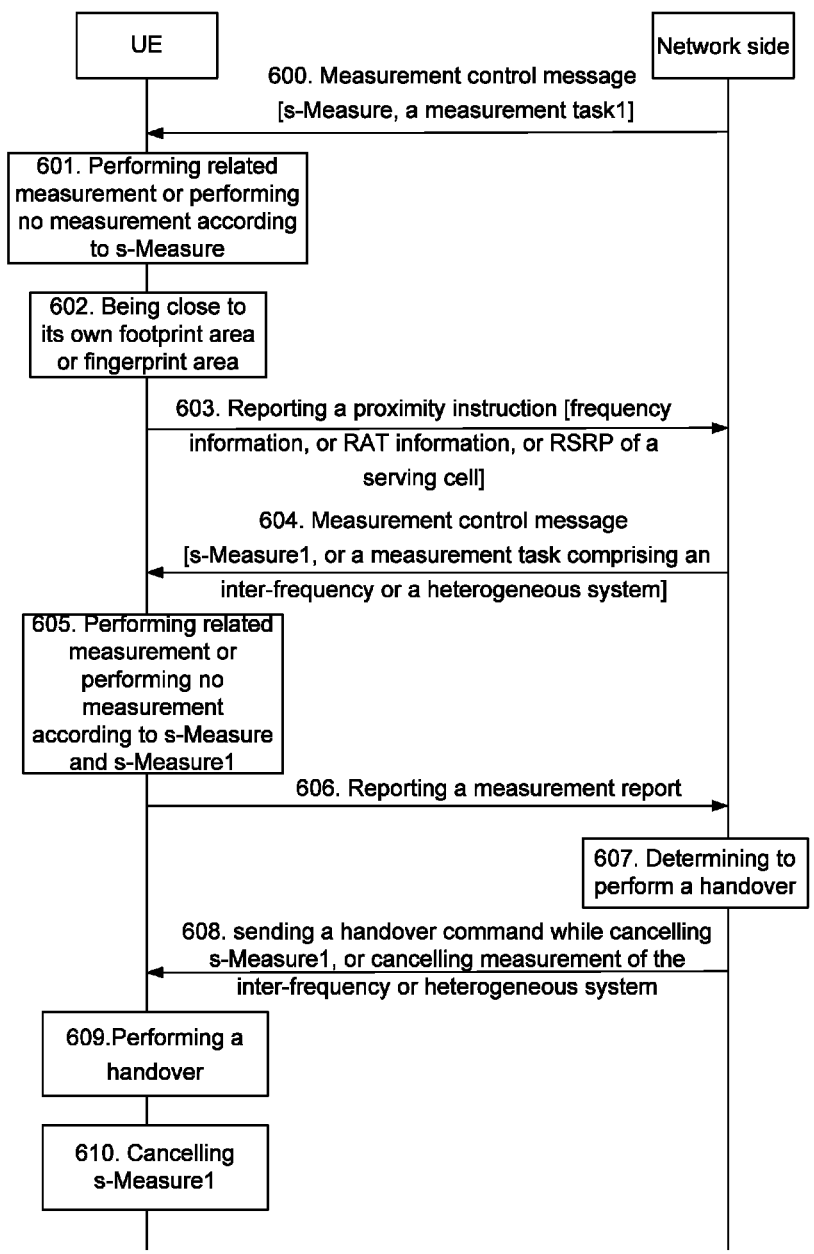
FIG. 6 shows a flowchart illustrating the third embodiment of a method for initiating cell measurement according to the disclosure.

FIG. 6 shows a flowchart illustrating the third embodiment of the method for initiating cell measurement according to the disclosure; the UE is in a connection status in the EUTRAN system, the carrier frequency of the serving cell where the UE is located is f1. As shown in FIG. 6, the method comprises the following steps.

Step 600: the network side sends a measurement control message to the UE, wherein the measurement control message contains s-Measure; in addition, the measurement control message contains a measurement task 1, which is a trigger event A3 that the signal quality of an EUTRAN adjacent cell is better than that of the serving cell, and the carrier frequency of the measurement object is f1.

Step 601: the UE performs related measurement or does not perform measurement according to the s-Measure.

Because the measurement control message does not contain s-Measure1, the condition that the UE performs the measurement task is: the servingRSRP is lower than the s-Measure; when the current servingRSRP is higher than the s-Measure, the UE does not perform the measurement task 1.

Steps 602~603: supposing that the UE is close to its own footprint area or fingerprint area, the UE reports a proximity instruction to the network side, and the proximity instruction contains the carrier frequency f2 on which a CSG cell or Hybrid cell is in the historical information stored by the UE, RAT (namely, the UTRAN) to which the cell belongs and can further contain the servingRSRP; wherein there are only CSG cells on the carrier frequency f2.

In this embodiment, if the network side is configured with a measurement task 2 of an event B2 of the carrier frequency f2 at the beginning, then in this step, the UE does not need to report the servingRSRP to the network side, and the network side only needs to instruct the UE to measure all UTRAN cells on the carrier frequency f2 in the measurement control message in the following step 604.

Step 604: the network side sends a measurement control message to the UE, wherein the measurement control message contains the measurement task 2, which is the trigger event (B2) that the signal quality of the serving cell is lower than a threshold 1 and the signal quality of an UTRAN adjacent cell is higher than a threshold 2, the carrier frequency of the measurement object is f2; at the same time, s-Measure1 aiming at the carrier frequency f2 is specified; the s-Measure1 is higher than the servingRSRP and used for the measurement of the CSG cells and/or Hybrid cells on the carrier frequency f2.

In this step, the network side can achieve the purpose of performing all the measurement tasks by the UE, by deleting the s-Measure.

Steps 605~606: the UE performs related measurement or does not perform measurement according to the s-Measure and the s-Measure1.

Supposing that the UE performs measurement of the CSG cells or the Hybrid cells in the measurement task 2, and finds that a CSG cell C1 satisfies the trigger condition of B2 in the measurement task 2, the UE reports the measurement result to the network side, wherein the measurement result comprises the cell C1.

Steps 607~610: after receiving the measurement report from the UE, the network side determines to perform a handover, and sends a handover command to the UE after the handover preparation process is finished; at the same time, the configuration of the s-Measure1 can be cancelled; after receiving the handover command, the UE performs the handover and cancels the s-Measure1.

In this step, if the network side determines not to perform the handover, no operation is performed. After a period of time, the UE is away from the footprint area or the fingerprint area and reports a departure instruction, then the network side deletes the measurement task 2.

The Fourth Embodiment

FIG. 7 shows a flowchart illustrating the fourth embodiment of the method for initiating cell measurement according to the disclosure; supposing that the UE is in a connection status in the EUTRAN system, the carrier frequency of the serving cell where the UE is located is f1, a measurement control message sent to the UE by a current network side contains s-Measure, and a measurement task 1 which is a trigger event (A3) that the signal quality of an EUTRAN adjacent cell is better than that of the serving cell; and supposing that the servingRSRP is always higher than the s-Measure, the UE does not perform measurement of the measurement task 1. As shown in FIG. 7, the method comprises the following steps.

Steps 700~701: the UE is close to footprint area or fingerprint area, and automatically initiates the measurement of the event A3 in the measurement task 1; supposing that the UE finds a Hybrid cell C4 satisfies the trigger condition of A3 in the measurement task 1, the UE reports the measurement result to the network side, wherein the measurement result comprises the cell C4.

In this step, the measuring range can be limited in the range of some carrier frequencies, such as the carrier frequencies of the CSG cells and/or Hybrid cells in the historical information stored by the UE.

Steps 703~705: after receiving the measurement report from the UE, the network side determines to perform a handover, and sends a handover command to the UE after the handover preparation process is finished; after receiving the handover command the UE performs the handover and then returns to the normal measurement process.

If the network side determines not to perform the handover, no operation is performed; after a period of time, the UE is away from the footprint area or the fingerprint area, then the UE automatically returns to the normal measurement process; or, the UE enters its own footprint area or fingerprint area, and returns to measurement performed according to the existing method.

The above home base station can be represented by an HNB or HeNB; when represented by the HNB, it is a home base station of the 3G system; when represented by the HeNB, it is a home base station of the LTE system.

The above are only the preferred embodiments of the disclosure and not intended to limit the protection scope of the disclosure, and any modifications, equivalent replacements, improvements within the spirit and principle of the disclosure shall fall within the protection scope of the disclosure.

What is claimed is:

1. A method for initiating cell measurement, comprising:
setting, by a base station located in a network side, an initiating condition for initiating measurement of a Closed Subscriber Group (CSG) cell and/or Hybrid cell;
initiating the measurement of the CSG cell and/or Hybrid cell by a User Equipment (UE) in a connection status when the initiating condition is satisfied;
generating, by the UE, a measurement report according to the measurement result and reporting, by the UE, the measurement report to the network side,
wherein the initiating condition is: pre-set Reference Signal Received Power (RSRP) values s-Measure and s-Measure1, s-Measure1 being higher than s-Measure, and satisfying the initiating condition is: a servingRSRP, which is a RSRP value of a serving cell and filtered by a layer 3, is lower than the s-Measure1;
performing measurement of all measurement tasks by the UE when the servingRSRP is lower than the s-Measure; wherein a measurement object comprises all cells on a designated carrier frequency in the measurement tasks;
performing no measurement of all the measurement tasks by the UE when the servingRSRP is higher than the s-Measure1.

2. The method according to claim 1, wherein the s-Measure1 is notified to the UE by the network side through a measurement control message.

3. The method according to claim 2, wherein the s-Measure1 is set aiming at one carrier frequency or multiple carrier frequencies or all the carrier frequencies.

4. The method according to claim 3, wherein the s-Measure1 is further set aiming at the CSG cell and/or Hybrid cell on one carrier frequency or multiple carrier frequencies or all the carrier frequencies.

5. The method according to claim 1, further comprising:
after receiving the measurement report from the UE, if determining to perform a handover, sending a handover command to the UE by the network side after a handover preparation process is finished and instructing cancelling of configuration of the s-Measure1 or cancelling of measurement of an inter-frequency at the same time; after receiving the handover command, performing the handover, and deleting the s-Measure1 by the UE at the same time;
if determining not to perform a handover, informing the UE to delete the s-Measure1 by the network side when the UE departs from its own footprint area or fingerprint area and reports a departure instruction; or after receiving the handover command, automatically deleting the s-Measure1 by the UE.

6. A method for initiating cell measurement, comprising:
setting an initiating condition for initiating measurement of a Closed Subscriber Group (CSG) cell and/or Hybrid cell;
initiating the measurement of the CSG cell and/or Hybrid cell by a User Equipment (UE) in a connection status when the initiating condition is satisfied;
generating, by the UE, a measurement report according to the measurement result and reporting, by the UE, the measurement report to the network side,
wherein satisfying the initiating condition is: the UE is close to its own footprint area or fingerprint area, and automatically initiates the measurement of the CSG cell and/or Hybrid cell.

7. The method according to claim 6, further comprising: performing the measurement of the measurement task according to an existing mode by the UE, when the UE departs from its own footprint area or fingerprint area or enters its own footprint area or fingerprint area.

8. The method according to claim 7, further comprising: when the UE is close to its own footprint area or fingerprint area,
reporting a proximity instruction to the network side by the UE; wherein the proximity instruction contains information of the frequency on which the CSG cell or Hybrid cell is, in historical information stored by the UE;
configuring a measurement task aiming at the received frequency information and sending the measurement task to the UE by the network side; wherein a measurement object is the received frequency.

9. The method according to claim 8, wherein the proximity instruction also contains the servingRSRP.

10. The method according to claim 8, wherein the s-Measure1 is set aiming at the frequency received by the network side.

11. A device for initiating cell measurement, comprising a setting module, an initiating module and a measuring module; wherein
the setting module including a processor and a memory, is arranged to set and store an initiating condition for initiating measurement of a CSG cell and/or Hybrid cell, wherein the initiating condition is: pre-set Reference Signal Received Power (RSRP) values s-Measure and s-Measure1, s-Measure1 being higher than s-Measure;
the initiating module is arranged to receive a servingRSRP and send a measurement notice to the measuring module when the initiating condition is satisfied, wherein the initiating condition is satisfied if a servingRSRP, which is a RSRP value of a serving cell and filtered by a layer 3, is lower than the s-Measure1;
the measuring module is arranged to receive the measurement notice from the initiating module and initiate the measurement of the CSG cell and/or Hybrid cell,
wherein measurement of all measurement tasks is performed when the servingRSRP is lower than the s-Measure; wherein a measurement object comprises all cells on a designated carrier frequency in the measurement tasks; and wherein no measurement is performed when the servingRSRP is higher than the s-Measure1.

12. A device for initiating cell measurement, comprising a setting module, an initiating module and a measuring module; wherein
the setting module including a processor and a memory, is arranged to set and store an initiating condition for initiating measurement of a CSG cell and/or Hybrid cell,
the initiating module is arranged to determine whether a UE is close to its own footprint area or fingerprint area, and send a measurement notice to the measuring module when the UE is close to its own footprint area or fingerprint area,
the measuring module is arranged to receive the measurement notice from the initiating module and initiate the measurement of the CSG cell and/or Hybrid cell.

13. A method for initiating cell measurement, comprising:
setting, by a base station located in a network side, an initiating condition for initiating measurement of a cell on a carrier frequency;
initiating the measurement of the cell on the carrier frequency by a UE in a connection status when the initiating condition is satisfied;
generating, by the UE, a measurement report according to the measurement result and reporting, by the UE, the measurement report to the network side, satisfying the initiating condition is: for a RSRP value s-Measure which is set aiming at different carrier frequencies, when a servingRSRP, which is a RSRP value of a serving cell and filtered by a layer 3, is lower than the s-Measure, initiating the measurement of the cell on the carrier frequency;

wherein the cell is a CSG cell and/or Hybrid cell;

the initiating condition further is: the set s-Measure aiming at the carrier frequency on which the CSG cell and/or Hybrid cell is, is different from that aiming at other carrier frequencies; wherein there is one carrier frequency or multiple carrier frequencies on which the CSG cell and/or Hybrid cell is.

14. The method according to claim 13, wherein the carrier frequency is dedicated to the CSG cell and/or Hybrid cell.

15. The method according to claim 13, wherein the s-Measure is notified to the UE by the network side through a measurement control message.

16. The method according to claim 13, further comprising: the UE being close to its footprint area or fingerprint area, and automatically initiating the measurement of the cell.

17. The method according to claim 16, further comprising: performing the measurement of a measurement task according to an existing mode by the UE when the UE departs from its own footprint area or fingerprint area or enters its own footprint area or fingerprint area.

18. The method according to claim 13, further comprising: when the UE is close to its own footprint area or fingerprint area, reporting a proximity instruction to the network side by the UE; wherein the proximity instruction contains information of a frequency on which a cell is, in historical information stored by the UE;

configuring a measurement task aiming at the received frequency information by the network side and sending the measurement task to the UE; a measurement object is the received frequency.

19. The method according to claim 18, wherein the proximity instruction further contains the servingRSRP.

20. The method according to claim 18, wherein the s-Measure is set aiming at the frequency received by the network side.

* * * * *